(No Model.)
W. V. ESMOND.
COMBINED CAMERA AND PHOTOGRAPH EXHIBITOR.
No. 488,331. Patented Dec. 20, 1892.
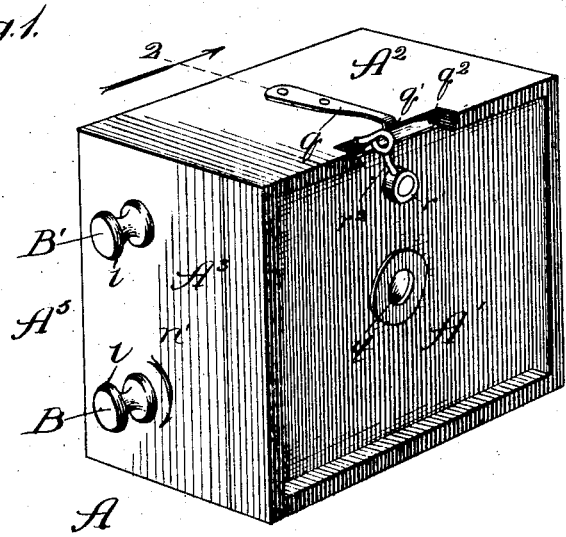
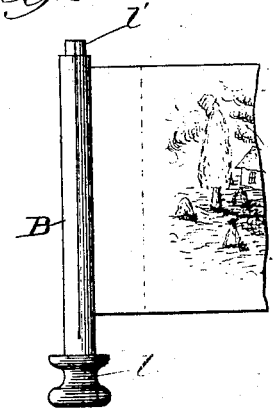
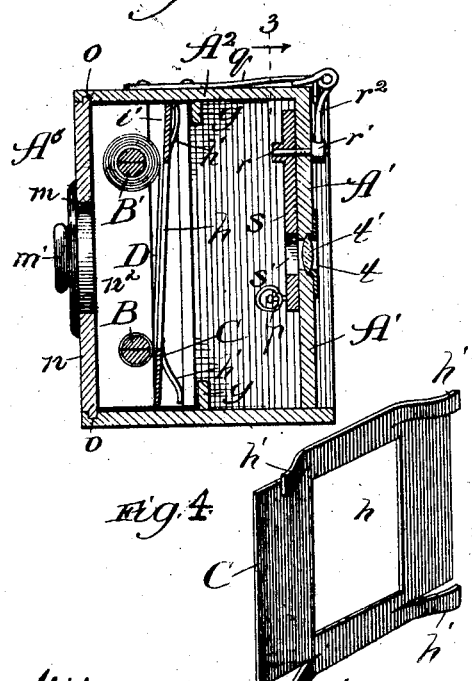
Witnesses:
Chas. E. Gaylord,
Clifford N. White.
Inventor:
William V. Esmond,
By Dyrenforth & Dyrenforth
Attys.

UNITED STATES PATENT OFFICE.

WILLIAM V. ESMOND, OF CHICAGO, ILLINOIS, ASSIGNOR OF ONE-HALF TO ALFRED C. KEMPER, OF SAME PLACE.

COMBINED CAMERA AND PHOTOGRAPH-EXHIBITOR.

SPECIFICATION forming part of Letters Patent No. 488,331, dated December 20, 1892.

Application filed July 5, 1892. Serial No. 438,979. (No model.)

*To all whom it may concern:*

Be it known that I, WILLIAM V. ESMOND, a citizen of the United States, residing at Chicago, in the county of Cook and State of Illinois, have invented a new and useful Improvement in a Combined Camera and Photograph-Exhibitor, of which the following is a specification.

My object is to provide, as a novelty, a construction of convertible camera and photograph exhibitor, by means of which negatives may be taken and the pictures, after being printed on suitable material, such as sensitized film, to produce transparencies, reinserted into the camera and viewed under transmitted light, in the camera, through a lens in the camera case.

Referring to the accompanying drawings—Figure 1 is a perspective view of my improved device; Fig. 2, a section taken at the line 2 on Fig. 1 and viewed in the direction of the arrow; Fig. 3, a perspective view of the removable roll-holder which forms the back and part of one side of the case; Fig. 4, a perspective view of a self-adjusting mat, which screens the sensitized film, about the surface which receives the negative, from the light when the exposure is made; and Fig. 5, a view in elevation of one of the rollers, showing a strip of sensitized film or translucent material attached thereto.

A is the inclosing case provided, at the center of its front side A', with an opening $t$, which contains a lens $t'$. On the inner side of the front A' is a swinging shutter having an opening through it, which registers with the lens when the shutter is in one position.

While a shutter is required in connection with my device to regulate the time in making exposures, any construction of shutter may be employed which can, when desired, be removed from the device or be caused to register with the opening $t$ and remain there when the device is to be employed as a photograph exhibitor, as hereinafter described. The shutter I prefer to employ is that shown in the drawings and parts thereof and of its operating mechanism are indicated by the reference letters $s$, $s'$, $r$, $r'$, $r^2$, $q$, $q'$, $q^2$. I make no claim to the construction of the shutter shown in the present connection.

$A^5$ is a roll-holder comprising a strip $n$ and two strips $n'$, $n^2$ integral with the strip $n$ and extending at right angles therefrom. The strip $n$, when in position, forms the back of the inclosing case, and the strip $n'$ a part of the side $A^3$. While the strip $n'$, as shown in the drawings, forms the greater part of the side $A^3$, of course the exact relative width of the strip is immaterial so long as it is sufficiently wide to perform its function in the roll-holder. The end of the strip $n$ adjacent to the strip $n^2$ extends beyond the latter, as shown in Fig. 3, and the said end and side edges of the strip $n$ are rabbeted, as shown, to enter grooves $o$ in the top, bottom and one side of the case. When the roll-holder $A^5$ is in position, the strip $n$ is in contact with the inner surface of one side of the case, and the strip $n'$ forms a part of the opposite side, the meeting edges of the parts fitting closely together to render the joints light-tight. At the center of the strip $n$ is an opening $m$ closed by a removable plug $m'$. The edges of the plug overlap the outer surface of the strip $n$ to render the joint light tight when the plug is in place. B and B' are rollers, each provided with a head $l$ at one end and reduced in diameter at the opposite end, as shown at $l'$ in Fig. 5. In the strip $n'$ are openings $k$, $k$, just large enough to receive the rollers, and in the strip $n^2$ are openings $k'$ just large enough to receive the reduced end-portions $l'$ of the rollers. The rollers B, B' are split centrally and longitudinally from their reduced ends $l'$ to or nearly to their head-portions $l$.

When the device is to be used for taking a negative, the rollers B, B' are withdrawn a short distance through the openings $k$ $k$ to free the reduced ends from the openings $k'$. The splits in the rollers afford openings into which the opposite ends of a strip of sensitized film D are inserted. The rollers are then moved longitudinally inward to cause the ends $l'$ to enter the openings $k'$. When the rollers are thus pressed into position, the inner surfaces of their heads $l$ are in contact with the outer surface of the strip $n'$, so that when the shutter closes the opening $t$ and the part $A^5$ is slid into place the casing A is light tight throughout. In the strips $n'$, $n^2$, at the forward side of the openings $k$, $k'$, are coincident grooves $i$, $i'$.

C is a mat having a central opening $h$. The mat C is stamped out of a sheet of springy metal and its four corners are cut and bent forward, as shown in Fig. 4, to produce the corner springs $h'$. When the roll-holder $A^5$ is out of the case, the mat C may be slipped into the grooves $i$, $i'$, to extend at its rear side against the film on the rollers. The corner-springs $h'$ extend into the grooves $i$, $i'$ and operate, by bearing against the stops formed by the sides of the grooves, to maintain the mat always in contact with the film to prevent the passage of light to the part of the film which is not to receive the exposure. Extending along the upper and lower sides of the case are cleats $g$, which prevent the passage of light around the upper and lower edges of the mat C, just as the grooves $i$, $i'$ afford shields for the lateral edges of the mat.

When the rollers with the sensitized film upon them are placed in the case and the shutter is opened, a negative picture will be produced upon that part of the film, which stretches between the rollers B, B', of the opening $h$ in the mat. The bulk of the roll of film being wound initially upon the roller B', as indicated in Fig. 2, after each exposure the roller B will be turned to wind up a length of the film equal to the distance between the rolls for a new exposure; and as the roll B increases in diameter the mat C at that side will be pressed forward against the resistance of the springs $h'$. As the roll B' diminishes, the resilience of the springs $h'$ at that side will cause the mat there to be pressed in the backward direction. There is thus always a light tight joint around the edges of the opening $h$; and, as the mat is clamped against the rolls, it operates as a tensioner for the film to keep it flat and smooth for the exposure.

A strip D of sensitized film of any desired length may be employed and be covered from one end to the other with negatives. This film is taken from the case and developed in the usual way, and then placed over a similar strip of translucent material, which may also be sensitized film; and the photographs are printed thereon from the negatives. The strip of translucent material carrying the photographs is then inserted at one of its ends into one of the rollers B or B', and at its opposite end into the other roller and wound upon one in the same way as when adjusting a strip of sensitized film for the production of negatives. The plug $m'$ in the back of the case is then removed, to admit light behind the adjusted strip, and the shutter opened to leave the lens unobstructed. On then placing the eye to the opening $t$ the photographs may be inspected through the lens $t'$ by turning the rollers to bring them successively into the field of vision.

As will be understood from the foregoing description, while my improved device is a convertible camera and photograph exhibitor, its exhibiting function is essentially that of presenting to view the picture as a transparency inside the camera case through a lens with the aid of transmitted light. Hence, as will be readily apparent, the lens employed must, of necessity, be of a kind which will enable the view in the camera case to be clearly seen through it (and preferably also magnified) from without the case.

My device constructed as described affords a very good camera and means for magnifying and inspecting the finished photographs; and it is preferably made so small as to be conveniently carried in the pocket.

What I claim as new and desire to secure by Letters Patent is:—

1. A convertible camera and photograph exhibitor, comprising in combination, a light-tight inclosing-case having an opening $t$ in the front side, an opening $m$ in the line of vision through the opening $t$, a lens $t'$ and a shutter at the opening $t$, a removable light-tight cover for the opening $m$, and rollers in the case, at opposite sides of the plane of the opening $t$, adapted to hold a strip of sensitized material for the taking of negatives, or a strip provided with transparencies to supplant the sensitized strip, and operative to move the strip across the field of view, substantially as described.

2. In a camera, the combination with the inclosing case and film-carrying rolls, of a resilient self-adjusting mat in the case, having an opening through it, and pressing at opposite sides of its opening normally against the rolls, whereby as the film is unrolled from one roll upon the other the mat by self-adjustment will maintain contact with each roll, substantially as and for the purpose set forth.

3. In a camera, the combination with the inclosing-case and film carrying rolls, of grooves $i$ $i'$ in the case adjacent to the rolls, and a mat C in the grooves provided with springs $h'$ operating to maintain the mat in contact with the rolls, substantially as and for the purpose set forth.

4. In a roll holder for cameras the combination with the roll-holder frame, and rolls supported therein, of stops in the frame and a mat and springs confined in the frame between the said stops and rolls, the springs operating to press the mat normally against the rolls, substantially as described.

WILLIAM V. ESMOND.

In presence of—
J. M. HANSOM,
BRUCE S. ELLIOTT.